G. G. JONES.
GRASS AND WEED DESTROYER.
APPLICATION FILED JUNE 21, 1916.
1,195,027.
Patented Aug. 15, 1916.
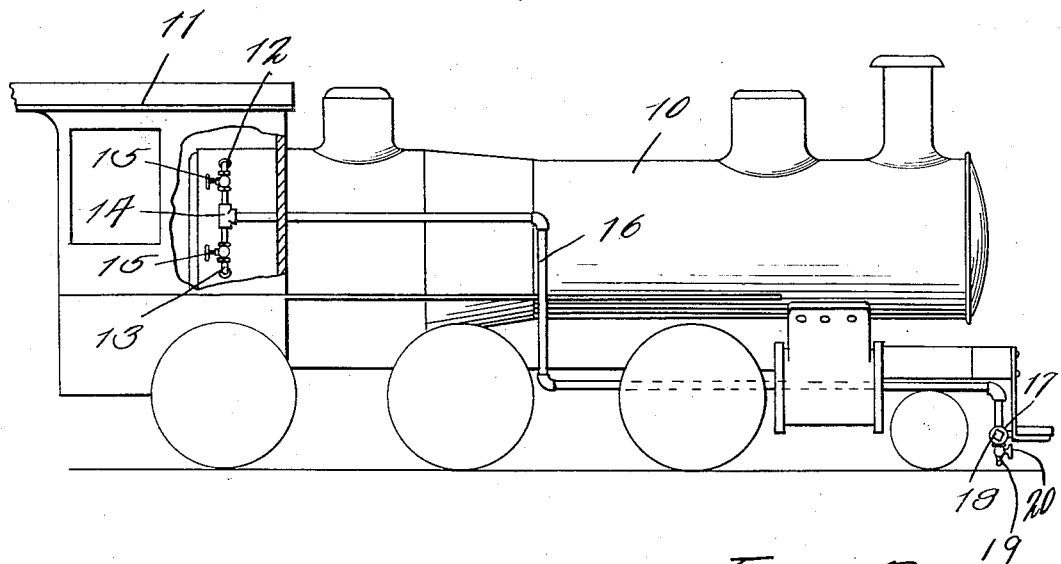
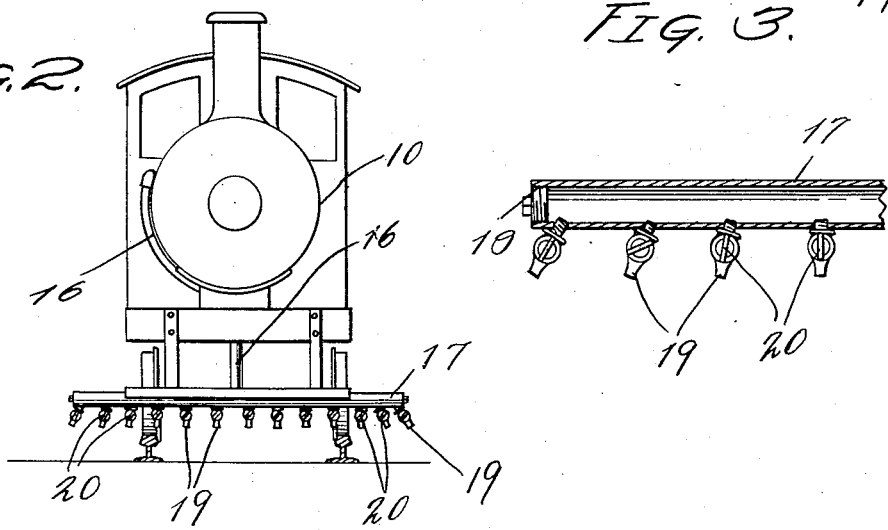
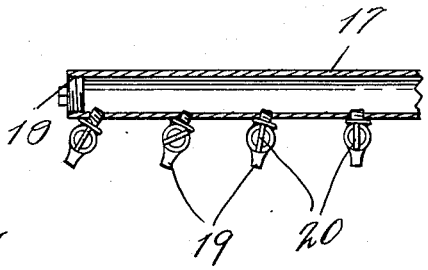
Inventor
G. G. Jones

UNITED STATES PATENT OFFICE.

GEORGE G. JONES, OF LARUE, PENNSYLVANIA.

GRASS AND WEED DESTROYER.

1,195,027.           Specification of Letters Patent.     Patented Aug. 15, 1916.

Application filed June 21, 1916. Serial No. 104,961.

*To all whom it may concern:*

Be it known that I, GEORGE G. JONES, a citizen of the United States, residing at Larue, in the county of York, State of Pennsylvania, have invented certain new and useful Improvements in Grass and Weed Destroyers; and I do hereby declare the following to be a full, clear, and exact description of the invention, such as will enable others skilled in the art to which it appertains to make and use the same.

This invention relates to weed and plant exterminators and has special reference to a device for exterminating the weeds and plants growing along the right of way of a railroad.

One important object of the invention is to provide an improved and simplified device of this character which will effectively and immediately act to exterminate all weeds and plants over which the device is passed.

Another important object of the invention is to provide a device of this character attached to a locomotive boiler and arranged in an improved manner so that it may be controlled by the engineer.

A third important object of the invention is to provide a novel construction of weed and plant exterminator which is so arranged as to act upon the growing weeds and plants by means of live steam, scalding water or a mixture of both live steam and scalding water, the quantities of either or both of the ingredients being controllable from the cab of an ordinary locomotive.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and Figure 1 is a diagrammatic view of a locomotive from the side thereof, showing the device applied thereto. Fig. 2 is a similar front view. Fig. 3 is a detail view of one end of a distributing pipe, used in connection herewith.

In the embodiment of the invention herein illustrated there is disclosed an ordinary locomotive having a boiler 10 and cab 11. Connected to the steam space of the boiler and leading through the cab 11 is a pipe 12. A similar second pipe 13 is connected to the water space of said boiler and also leads through the cab 11, the ends of said pipes 12 and 13 being connected to respective ends of a T-fitting 14. In each of the pipes 12 and 13 there is provided a valve 15, these valves being located within convenient reach of the engineer, so that there is thereby afforded independently water and steam control. The side outlet of the T-fitting 14 is connected to one end of a third pipe 16 which leads to the front of the engine being there extended transversely beneath the front bumper as indicated at 17. The end of this pipe is provided with a cap 18 to form a closure therefor and depending from the pipe is a series of spaced nozzles 19 each provided with a controlling valve 20 and each having a downwardly opening end. These nozzles are arranged as shown in Figs. 2 and 3.

In the operation of the device, the locomotive is run over the road in the usual manner and when a stretch of road is reached which has weeds or plants growing thereon which it is desired to exterminate the engineer opens one or both of the valves 15 as his judgment dictates so that there is ejected through the nozzles 19 a series of streams of live steam, scalding water or a mixture of steam and water. This, striking the growing plants immediately causes them to wither and at the same time the seeds which may have dropped into the road bed are also scalded so that they will not germinate. By means of the valves 20 any of the nozzles 19 which it is not desired to use may be shut off, or, if it is desired to decrease the flow of steam or water along one part of the road bed this may be done by partly closing appropriate valves 20.

It will be observed that the device is at all times under the control of the engineer.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

The combination with a locomotive boiler; of a pipe leading from the steam space of the boiler, a second pipe leading from the water space of said boiler, a T-fitting to the ends of which said pipes are connected, a valve in each of said pipes to afford independent water and steam control, a third pipe leading from the side of the T to the front of the engine, said third pipe being extended transversely across the engine beneath the front bumper and closed at its end, a series of spaced nozzles depending from the transversely extending portion of the third pipe and terminating in downwardly opening ends, and a valve for each of said nozzles.

In testimony whereof, I affix my signature, in the presence of two witnesses.

GEORGE G. JONES.

Witnesses:
L. N. GILLIS,
ARTHUR MOORE.